(12) United States Patent
Wyler

(10) Patent No.: US 10,835,972 B2
(45) Date of Patent: Nov. 17, 2020

(54) BLADE CLAMP FOR POWER TOOL

(71) Applicant: MILWAUKEE ELECTRIC TOOL CORPORATION, Brookfield, WI (US)

(72) Inventor: Andrew R. Wyler, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/280,439

(22) Filed: Feb. 20, 2019

(65) Prior Publication Data

US 2019/0283155 A1    Sep. 19, 2019

Related U.S. Application Data

(60) Provisional application No. 62/643,851, filed on Mar. 16, 2018.

(51) Int. Cl.
*B23D 51/10* (2006.01)
*B23D 49/16* (2006.01)

(52) U.S. Cl.
CPC ........... *B23D 51/10* (2013.01); *B23D 49/162* (2013.01)

(58) Field of Classification Search
CPC ........ B23D 51/10; B23D 51/00; B23D 51/08; B23D 51/14; B23D 49/162; B23D 49/00; B23D 49/14; B23D 49/007; B23D 49/08; B23D 49/10; B23D 49/16
USPC .................................................. 30/392–394
See application file for complete search history.

(56) References Cited

U.S. PATENT DOCUMENTS 2,306,769 A    12/1942    Wilhide
2,320,113 A     5/1943    Wilhide
2,781,800 A     2/1957    Papworth
2,931,402 A     4/1960    Papworth
2,949,944 A     8/1960    Blachly
(Continued)

FOREIGN PATENT DOCUMENTS

CN    2295295 Y    10/1998
CN    2369805 Y     3/2000
(Continued)

OTHER PUBLICATIONS

International Search Report and Written Opinion for Application No. PCT/US2019/018701, dated May 29, 2019, 12 pages.
(Continued)

*Primary Examiner* — Phong H Nguyen

(74) *Attorney, Agent, or Firm* — Michael Best & Friedrich LLP

(57) ABSTRACT

A blade clamp for use with a power tool having a reciprocating spindle. The blade clamp comprises a cover threaded to the spindle for relative axial movement thereto in response to rotation of the cover relative to the spindle, an ejector pin positioned within the spindle, and a spring coupling the cover and the spindle. The spring biases the cover toward a first rotational position relative to the spindle coinciding with a locked configuration of the blade clamp. The cover is rotatable against the bias of the spring toward a second rotational position relative to the spindle coinciding with an unlocked configuration of the blade clamp. In the unlocked configuration, the ejector pin maintains the cover in the second rotational position. In response to insertion of a blade into the spindle, the blade clamp is automatically adjustable from the unlocked configuration to the locked configuration.

21 Claims, 7 Drawing Sheets

(56) References Cited

U.S. PATENT DOCUMENTS

| | | |
|---|---|---|
| 2,980,218 A | 4/1961 | Young |
| 3,121,813 A | 2/1964 | Pratt et al. |
| 3,225,232 A | 12/1965 | Turley et al. |
| 3,309,484 A | 3/1967 | Frenzel |
| 3,328,613 A | 6/1967 | Gawron |
| 3,388,728 A | 6/1968 | Riley, Jr. et al. |
| 3,491,259 A | 1/1970 | Damijonaitis et al. |
| 3,536,943 A | 10/1970 | Bowen, III et al. |
| 3,611,095 A | 10/1971 | Schnizler |
| 3,695,344 A | 10/1972 | Schnizler, Jr. |
| 3,739,659 A | 6/1973 | Workman, Jr. |
| 3,842,328 A | 10/1974 | Supel et al. |
| 3,965,778 A | 6/1976 | Aspers et al. |
| 4,002,959 A | 1/1977 | Schadlich et al. |
| 4,118,615 A | 10/1978 | Leibundgut |
| 4,129,240 A | 12/1978 | Geist |
| 4,157,491 A | 6/1979 | Werner et al. |
| 4,238,884 A | 12/1980 | Walton, II |
| 4,240,204 A | 12/1980 | Walton, II et al. |
| 4,262,421 A | 4/1981 | Bergler et al. |
| 4,298,072 A | 11/1981 | Baker et al. |
| 4,307,325 A | 12/1981 | Saar |
| 4,342,929 A | 8/1982 | Horne |
| 4,348,603 A | 9/1982 | Huber |
| 4,410,846 A | 10/1983 | Gerber et al. |
| 4,412,158 A | 10/1983 | Jefferson et al. |
| 4,418,562 A | 12/1983 | Sakai et al. |
| 4,490,771 A | 12/1984 | Huber et al. |
| 4,503,370 A | 3/1985 | Cuneo |
| 4,504,769 A | 3/1985 | Fushiya et al. |
| 4,516,324 A | 5/1985 | Heininger, Jr. et al. |
| 4,543,723 A | 10/1985 | Bortfield et al. |
| 4,574,226 A | 3/1986 | Binder |
| 4,628,459 A | 12/1986 | Shinohara et al. |
| 4,628,605 A | 12/1986 | Clowers |
| 4,689,534 A | 8/1987 | Gerber et al. |
| 4,725,764 A | 2/1988 | Prestel |
| 4,881,435 A | 11/1989 | Hansson |
| 4,940,177 A | 7/1990 | Jimena |
| 4,964,558 A | 10/1990 | Crutcher et al. |
| 5,007,776 A | 4/1991 | Shoji |
| 5,017,109 A | 5/1991 | Albert et al. |
| 5,105,130 A | 4/1992 | Barker et al. |
| 5,115,175 A | 5/1992 | Fletcher |
| 5,120,983 A | 6/1992 | Samann |
| 5,146,682 A | 9/1992 | Blochle et al. |
| 5,154,242 A | 10/1992 | Soshin et al. |
| 5,196,747 A | 3/1993 | Kress et al. |
| 5,203,242 A | 4/1993 | Hansson |
| 5,268,622 A | 12/1993 | Philipp |
| 5,440,215 A | 8/1995 | Gilmore |
| 5,443,196 A | 8/1995 | Burlington |
| 5,443,276 A | 8/1995 | Nasser et al. |
| 5,526,460 A | 6/1996 | DeFrancesco et al. |
| 5,558,476 A | 9/1996 | Uchida et al. |
| 5,596,810 A | 1/1997 | Neubert et al. |
| 5,605,268 A | 2/1997 | Hayashi et al. |
| 5,644,846 A | 7/1997 | Durr et al. |
| 5,732,870 A | 3/1998 | Moorman et al. |
| 5,738,177 A | 4/1998 | Schell et al. |
| 5,747,953 A | 5/1998 | Philipp |
| 5,798,584 A | 8/1998 | Schaeffeler et al. |
| 5,798,589 A | 8/1998 | Ohi et al. |
| 5,923,145 A | 7/1999 | Reichard et al. |
| 5,931,072 A | 8/1999 | Shibata |
| 5,933,969 A | 8/1999 | Houben et al. |
| 5,946,810 A * | 9/1999 | Hoelderlin ............ B23D 51/10 279/30 |
| 6,025,683 A | 2/2000 | Philipp |
| 6,047,477 A | 4/2000 | Di Nicolantonio |
| D426,124 S | 6/2000 | Kassalen et al. |
| 6,121,700 A | 9/2000 | Yamaguchi et al. |
| 6,155,246 A | 12/2000 | Yamami et al. |
| 6,241,027 B1 | 6/2001 | Beck et al. |
| 6,308,425 B1 | 10/2001 | Schumann |
| 6,320,286 B1 | 11/2001 | Ramarathnam |
| 6,353,705 B1 | 3/2002 | Capps et al. |
| 6,491,114 B1 | 12/2002 | Webel |
| 6,508,313 B1 | 1/2003 | Carney et al. |
| 6,518,719 B1 | 2/2003 | Suzuki et al. |
| 6,522,041 B1 | 2/2003 | Verbrugge et al. |
| 6,536,536 B1 | 3/2003 | Gass et al. |
| 6,538,403 B2 | 3/2003 | Gorti et al. |
| 6,568,089 B1 | 5/2003 | Popik et al. |
| D475,264 S | 6/2003 | Kondo et al. |
| 6,606,779 B2 | 8/2003 | Verbrugge et al. |
| 6,612,039 B2 | 9/2003 | Kakiuchi et al. |
| D468,983 S | 10/2003 | Kondo et al. |
| 6,669,072 B2 | 12/2003 | Burke et al. |
| 6,750,579 B2 | 6/2004 | Verbrugge et al. |
| 6,755,336 B2 | 6/2004 | Harper et al. |
| 6,771,043 B2 | 8/2004 | Matsunaga et al. |
| 6,796,475 B2 | 9/2004 | Adams |
| 6,810,589 B2 | 11/2004 | Lagaly et al. |
| 6,848,985 B2 | 2/2005 | Lamprecht et al. |
| 6,873,124 B2 | 3/2005 | Kawano et al. |
| 6,882,127 B2 | 4/2005 | Konigbauer |
| 6,892,459 B2 | 5/2005 | Okumara et al. |
| 6,945,337 B2 | 9/2005 | Kawai et al. |
| 6,974,061 B2 | 12/2005 | Adams et al. |
| 6,975,050 B2 | 12/2005 | Cleanthous et al. |
| 6,978,846 B2 | 12/2005 | Kawai et al. |
| 7,018,142 B2 | 3/2006 | Cooper |
| 7,047,651 B2 | 5/2006 | Delfini et al. |
| D522,829 S | 6/2006 | Andriolo |
| 7,058,291 B2 | 6/2006 | Weaver et al. |
| D524,620 S | 7/2006 | Netzler |
| 7,082,867 B2 | 8/2006 | Liao |
| D527,598 S | 9/2006 | Netzler |
| 7,101,274 B1 | 9/2006 | Etter et al. |
| 7,103,979 B2 | 9/2006 | Yoshida et al. |
| 7,109,675 B2 | 9/2006 | Matsunaga et al. |
| 7,112,934 B2 | 9/2006 | Gilmore |
| D530,173 S | 10/2006 | Waldron |
| 7,219,435 B2 | 5/2007 | Yoshida et al. |
| 7,246,533 B2 | 7/2007 | Lagaly et al. |
| 7,254,892 B2 | 8/2007 | Walker |
| 7,314,097 B2 | 1/2008 | Jenner et al. |
| 7,350,302 B2 | 4/2008 | Imai et al. |
| 7,372,226 B2 | 5/2008 | Wiker et al. |
| 7,419,013 B2 | 9/2008 | Sainomoto et al. |
| 7,428,934 B2 | 9/2008 | Arimura |
| 7,513,047 B2 | 4/2009 | Wu |
| 7,516,553 B2 | 4/2009 | Yoshida et al. |
| 7,518,837 B2 | 4/2009 | Tseng et al. |
| 7,526,867 B2 | 5/2009 | Park |
| 7,538,503 B2 | 5/2009 | Machens et al. |
| 7,552,749 B2 | 6/2009 | Kageler et al. |
| 7,554,290 B2 | 6/2009 | Johnson et al. |
| 7,596,873 B2 | 10/2009 | Di Nicolantonio |
| 7,628,102 B2 | 12/2009 | Kamiya et al. |
| 7,748,125 B2 | 7/2010 | Rakaczki |
| 7,771,253 B2 | 8/2010 | Wuensch |
| 7,784,388 B2 | 8/2010 | Chen |
| 7,818,887 B2 | 10/2010 | Saegesser et al. |
| 7,823,458 B2 | 11/2010 | Kibblewhite et al. |
| 7,882,899 B2 | 2/2011 | Borinato et al. |
| 7,882,900 B2 | 2/2011 | Borinato et al. |
| 7,893,586 B2 | 2/2011 | West et al. |
| 7,908,736 B2 | 3/2011 | Smith et al. |
| 8,022,654 B2 | 9/2011 | Zhao et al. |
| 8,046,926 B2 | 11/2011 | Bigden et al. |
| RE43,041 E | 12/2011 | Adams et al. |
| 8,074,731 B2 | 12/2011 | Iwata et al. |
| 8,082,825 B2 | 12/2011 | Butler |
| 8,141,444 B2 | 3/2012 | Lagaly et al. |
| 8,171,616 B2 | 5/2012 | Smith et al. |
| 8,176,069 B2 | 5/2012 | Matsunaga et al. |
| 8,179,069 B2 | 5/2012 | Matsunaga et al. |
| 8,272,135 B2 | 9/2012 | Zhou |
| 8,281,874 B2 | 10/2012 | Imada et al. |
| 8,291,603 B2 | 10/2012 | Saegesser et al. |
| 8,324,845 B2 | 12/2012 | Suzuki et al. |
| 8,336,432 B1 | 12/2012 | Butler |

(56) References Cited

U.S. PATENT DOCUMENTS

| | | |
|---|---|---|
| 8,360,166 B2 | 1/2013 | Iimura et al. |
| 8,461,785 B2 | 6/2013 | Sidhu |
| 8,564,236 B2 | 10/2013 | Hirabayashi et al. |
| 8,587,230 B2 | 11/2013 | Pant et al. |
| 8,587,231 B2 | 11/2013 | Pant |
| 8,627,900 B2 | 1/2014 | Oomori et al. |
| 8,653,764 B2 | 2/2014 | Oberheim |
| 8,656,598 B2 | 2/2014 | Kaiser et al. |
| 8,678,106 B2 | 3/2014 | Matsunaga et al. |
| 8,698,430 B2 | 4/2014 | Watanabe et al. |
| 8,713,806 B2 | 5/2014 | Tokunaga et al. |
| 8,732,962 B2 | 5/2014 | Laett |
| 8,752,644 B2 | 6/2014 | Weusthof |
| 8,757,287 B2 | 6/2014 | Mak et al. |
| 8,763,258 B2 | 7/2014 | Miller et al. |
| 8,813,373 B2 | 8/2014 | Scott |
| 8,826,548 B2 | 9/2014 | Kaiser et al. |
| 8,881,842 B2 | 11/2014 | Borinato et al. |
| 8,931,576 B2 | 1/2015 | Iwata |
| 9,044,851 B2 | 6/2015 | Tully |
| 9,085,087 B2 | 7/2015 | Ni et al. |
| 9,114,519 B2 | 8/2015 | Iwata et al. |
| 9,138,885 B2 | 9/2015 | Tully |
| 9,154,009 B2 | 10/2015 | Alemu |
| 9,186,735 B2 | 11/2015 | da Graca |
| 9,257,925 B2 | 2/2016 | Coates |
| 9,314,855 B2 | 4/2016 | Ookubo et al. |
| 9,314,900 B2 | 4/2016 | Vanko et al. |
| 9,318,932 B2 | 4/2016 | Purohit et al. |
| 9,321,112 B2 | 4/2016 | Vantran et al. |
| 9,406,915 B2 | 8/2016 | White et al. |
| 9,444,307 B2 | 9/2016 | Watanabe et al. |
| 9,450,472 B2 | 9/2016 | Hatfield et al. |
| 9,543,871 B2 | 1/2017 | Kato |
| 9,554,807 B2 | 1/2017 | McGinley et al. |
| 9,583,745 B2 | 2/2017 | White et al. |
| 9,583,793 B2 | 2/2017 | White et al. |
| 9,604,355 B2 | 3/2017 | Tully |
| 9,762,153 B2 | 9/2017 | Forster et al. |
| 9,827,623 B2 | 11/2017 | Gibbons et al. |
| 9,833,891 B2 | 12/2017 | Patterson |
| 9,866,153 B2 | 1/2018 | Kusakawa |
| 9,871,484 B2 | 1/2018 | White et al. |
| 9,889,548 B2 | 2/2018 | Sattler |
| 9,893,384 B2 | 2/2018 | Velderman et al. |
| 2002/0057147 A1 | 5/2002 | Shinoura et al. |
| 2002/0185514 A1 | 12/2002 | Adams et al. |
| 2003/0015979 A1 | 1/2003 | Karwath |
| 2003/0110918 A1* | 6/2003 | Baxivanelis ............ B23D 51/10 83/699.11 |
| 2003/0121677 A1 | 7/2003 | Watanabe et al. |
| 2003/0190877 A1 | 10/2003 | Gallagher et al. |
| 2004/0113583 A1 | 6/2004 | Konigbauer |
| 2004/0117993 A1 | 6/2004 | Armstrong |
| 2004/0197159 A1 | 10/2004 | Ishida et al. |
| 2004/0200628 A1 | 10/2004 | Schmitzer et al. |
| 2005/0058890 A1 | 3/2005 | Brazell et al. |
| 2005/0061523 A1 | 3/2005 | Bader et al. |
| 2005/0132582 A1 | 6/2005 | Gudmundson |
| 2006/0096103 A1 | 5/2006 | Roberts |
| 2006/0168824 A1 | 8/2006 | Roberts |
| 2006/0255166 A1 | 11/2006 | Imamura et al. |
| 2006/0288594 A1 | 12/2006 | Delfini et al. |
| 2007/0101586 A1 | 5/2007 | Felder et al. |
| 2007/0247095 A1 | 10/2007 | Machens et al. |
| 2007/0273311 A1 | 11/2007 | Guinet et al. |
| 2008/0010840 A1 | 1/2008 | Lagaly et al. |
| 2008/0189962 A1 | 8/2008 | Reuss et al. |
| 2008/0209742 A1 | 9/2008 | Kretschmar et al. |
| 2009/0000128 A1 | 1/2009 | Kaiser et al. |
| 2009/0077820 A1 | 3/2009 | Gibbons et al. |
| 2010/0000100 A1* | 1/2010 | Saegesser ............ B23D 51/10 30/392 |
| 2010/0031517 A1 | 2/2010 | Fukinuki et al. |
| 2010/0034604 A1 | 2/2010 | Imamura et al. |
| 2010/0175902 A1 | 7/2010 | Rejman et al. |
| 2010/0222713 A1 | 9/2010 | Faller et al. |
| 2010/0224384 A1 | 9/2010 | Gwosdz et al. |
| 2010/0229892 A1 | 9/2010 | Reese et al. |
| 2011/0114347 A1 | 5/2011 | Kasuya et al. |
| 2011/0154921 A1 | 6/2011 | Duan |
| 2011/0162861 A1 | 7/2011 | Borinato et al. |
| 2011/0239473 A1 | 10/2011 | Zurkirchen |
| 2011/0283858 A1 | 11/2011 | Zhou |
| 2011/0296697 A1* | 12/2011 | Kani .................... B23D 51/10 30/394 |
| 2011/0303427 A1 | 12/2011 | Tang |
| 2012/0192440 A1 | 8/2012 | Jerabek et al. |
| 2012/0199372 A1 | 8/2012 | Nishikawa et al. |
| 2012/0247796 A1 | 10/2012 | Mueller et al. |
| 2012/0279736 A1 | 11/2012 | Tanimoto et al. |
| 2013/0062086 A1 | 3/2013 | Ito et al. |
| 2013/0076271 A1 | 3/2013 | Suda et al. |
| 2013/0087355 A1 | 4/2013 | Oomori et al. |
| 2013/0126202 A1 | 5/2013 | Oomori et al. |
| 2013/0145631 A1 | 6/2013 | Ni et al. |
| 2013/0171918 A1 | 7/2013 | Huang |
| 2013/0187587 A1 | 7/2013 | Knight et al. |
| 2013/0189043 A1 | 7/2013 | Uchiuzo et al. |
| 2013/0206437 A1 | 8/2013 | Saitou |
| 2013/0207491 A1 | 8/2013 | Hatfield et al. |
| 2013/0270934 A1 | 10/2013 | Smith et al. |
| 2013/0277081 A1 | 10/2013 | Hayashi et al. |
| 2013/0333910 A1 | 12/2013 | Tanimoto et al. |
| 2013/0342041 A1 | 12/2013 | Ayers et al. |
| 2014/0013917 A1 | 1/2014 | Meier |
| 2014/0062265 A1 | 3/2014 | Zeng et al. |
| 2014/0117892 A1 | 5/2014 | Coates |
| 2014/0216773 A1 | 8/2014 | Steurer |
| 2014/0216777 A1 | 8/2014 | Emch et al. |
| 2014/0245620 A1 | 9/2014 | Fankhauser et al. |
| 2014/0310964 A1 | 10/2014 | Miller et al. |
| 2014/0331506 A1 | 11/2014 | Sugita et al. |
| 2014/0352995 A1 | 12/2014 | Matsunaga et al. |
| 2015/0042247 A1 | 2/2015 | Kusakawa |
| 2015/0135907 A1 | 5/2015 | Hirabayashi et al. |
| 2015/0148806 A1 | 5/2015 | McGinley et al. |
| 2015/0212512 A1 | 7/2015 | Butler |
| 2015/0290790 A1 | 10/2015 | Schomisch et al. |
| 2015/0298308 A1 | 10/2015 | Kato |
| 2016/0008961 A1 | 1/2016 | Takano et al. |
| 2016/0079887 A1 | 3/2016 | Takano et al. |
| 2016/0129578 A1 | 5/2016 | Sprenger et al. |
| 2016/0151845 A1 | 6/2016 | Yamamoto et al. |
| 2016/0193673 A1 | 7/2016 | Yoshida et al. |
| 2016/0218589 A1 | 7/2016 | Purohit et al. |
| 2017/0008159 A1 | 1/2017 | Boeck et al. |
| 2017/0151660 A1 | 6/2017 | Tully |
| 2017/0157760 A1 | 6/2017 | McAuliffe et al. |
| 2017/0222579 A1 | 8/2017 | Wang et al. |
| 2017/0264219 A1 | 9/2017 | Takeda |
| 2017/0338452 A1 | 11/2017 | Varipatis et al. |
| 2017/0338753 A1 | 11/2017 | Forster et al. |
| 2017/0338754 A1 | 11/2017 | Forster et al. |
| 2018/0099394 A1 | 4/2018 | Ichikawa et al. |
| 2018/0316292 A1 | 11/2018 | Wu |

FOREIGN PATENT DOCUMENTS

| | | |
|---|---|---|
| CN | 1695857 A | 11/2005 |
| CN | 201244699 Y | 5/2009 |
| CN | 201659555 U | 12/2010 |
| CN | 101989070 A | 3/2011 |
| CN | 202068299 U | 12/2011 |
| CN | 202622753 U | 12/2012 |
| CN | 103567500 A | 2/2014 |
| CN | 103785665 A | 5/2014 |
| CN | 203606853 U | 6/2014 |
| CN | 104065231 A | 9/2014 |
| CN | 203843806 U | 9/2014 |
| CN | 204103728 U | 1/2015 |
| CN | 104690596 A | 6/2015 |
| CN | 204517624 U | 7/2015 |
| CN | 204585170 U | 8/2015 |

(56) References Cited

FOREIGN PATENT DOCUMENTS

| | | |
|---|---|---|
| CN | 204585171 U | 8/2015 |
| CN | 204696893 U | 10/2015 |
| CN | 105215951 A | 1/2016 |
| CN | 205310192 U | 6/2016 |
| CN | 106964843 A | 7/2017 |
| CN | 107570799 A | 1/2018 |
| DE | 3318199 A1 | 11/1984 |
| DE | 2650470 A1 | 5/1987 |
| DE | 3538941 A1 | 5/1987 |
| DE | 3538942 A1 | 5/1987 |
| DE | 8808570 U1 | 9/1988 |
| DE | 3214482 C2 | 10/1988 |
| DE | 19617477 A1 | 11/1997 |
| DE | 202007004931 U1 | 9/2007 |
| DE | 202007010879 U1 | 10/2007 |
| DE | 202008010458 U1 | 11/2008 |
| DE | 102007042185 A1 | 3/2009 |
| DE | 102009032405 A1 | 5/2010 |
| DE | 102010001030 A1 | 7/2011 |
| DE | 102012218275 A1 | 4/2014 |
| DE | 102013202202 A1 | 8/2014 |
| DE | 102016210937 A1 | 12/2017 |
| EP | 0031867 A2 | 7/1981 |
| EP | 0018465 B1 | 4/1984 |
| EP | 0224053 A2 | 6/1987 |
| EP | 0423673 B1 | 12/1994 |
| EP | 0628762 A1 | 12/1994 |
| EP | 0716492 A1 | 6/1996 |
| EP | 0617505 B1 | 11/1996 |
| EP | 1074327 A2 | 2/2001 |
| EP | 1442813 A2 | 8/2004 |
| EP | 3000563 A1 | 3/2016 |
| EP | 3260240 A1 | 12/2017 |
| JP | S63251175 A | 10/1988 |
| JP | S63176075 U | 11/1988 |
| JP | H08141928 A | 6/1996 |
| JP | H08290312 A | 11/1996 |
| JP | H11164579 A | 6/1999 |
| JP | 2004255542 A | 9/2004 |
| JP | 2004322262 A | 11/2004 |
| JP | 4359018 B2 | 11/2009 |
| JP | 2009297807 A | 12/2009 |
| JP | 2010110875 A | 5/2010 |
| JP | 2014233793 A | 12/2014 |
| JP | 2015024486 A | 2/2015 |
| NL | 8803009 A | 7/1990 |
| WO | WO2005102602 A2 | 11/2005 |
| WO | WO2007083447 A1 | 7/2007 |
| WO | WODM073765 | 3/2010 |
| WO | WO2010081771 A1 | 7/2010 |
| WO | WO2011018276 A1 | 2/2011 |
| WO | WO2011047904 A1 | 4/2011 |
| WO | WO2011072436 A1 | 6/2011 |
| WO | WO2011134775 A1 | 11/2011 |
| WO | WO2012135608 A1 | 10/2012 |
| WO | WO2013161118 A1 | 10/2013 |
| WO | WO2014001124 A1 | 1/2014 |

OTHER PUBLICATIONS

Festool USA, "Getting Started: Festool Carvex Jigsaw—Setup and Common Uses." YouTube, published Sep. 17, 2013, https://www.youtube.com/watch?v=6ZPlodgspwc.

International Search Report and Written Opinion for Application No. PCT/US2019/023537, dated Jul. 4, 2019, 12 pages.

* cited by examiner

BLADE CLAMP FOR POWER TOOL

CROSS-REFERENCE TO RELATED APPLICATIONS

This application claims priority to U.S. Provisional Patent Application No. 62/643,851 filed on Mar. 16, 2018, the entire contents of which are incorporated herein by reference.

FIELD OF THE INVENTION

The present invention relates to blade clamps, and more specifically to blade clamps for securing cutting blades to a power tool.

BACKGROUND OF THE INVENTION

Cutting tools, such as jigsaws, typically include a clamp for securing a cutting blade thereto. Such blade clamps may be adjustable between a locked configuration, where the blade is secured to a spindle, and an unlocked configuration, where the blade is removable from the spindle.

SUMMARY OF THE INVENTION

The present invention provides, in one aspect, a blade clamp for use with a power tool, such as a jigsaw, having a reciprocating spindle. The blade clamp comprises a cover threaded to the spindle for relative axial movement thereto in response to rotation of the cover relative to the spindle, an ejector pin positioned within the spindle, and a spring coupling the cover and the spindle. The spring biases the cover toward a first rotational position relative to the spindle coinciding with a locked configuration of the blade clamp. The cover is rotatable against the bias of the spring toward a second rotational position relative to the spindle coinciding with an unlocked configuration of the blade clamp. In the unlocked configuration, the ejector pin maintains the cover in the second rotational position. In response to insertion of a blade into the spindle, the ejector pin disengages the cover, permitting the spring to rebound and rotate the cover from the second rotational position toward the first rotational position, thereby automatically adjusting the blade clamp from the unlocked configuration to the locked configuration.

The present invention provides, in another aspect, a reciprocating power tool including a housing and a spindle supported by the housing for relative movement therewith. The power tool further includes a blade clamp for securing a blade to the spindle. The blade clamp includes a cover threaded to the spindle for relative axial movement thereto in response to rotation of the cover relative to the spindle. An ejector pin is positioned within the spindle. A spring couples the cover and the spindle. The spring biases the cover toward a first rotational position relative to the spindle coinciding with a locked configuration of the blade clamp. The cover is rotatable against the bias of the spring toward a second rotational position relative to the spindle coinciding with an unlocked configuration of the blade clamp. In the unlocked configuration, the ejector pin maintains the cover in the second rotational position. In response to insertion of the blade into the spindle, the ejector pin disengages the cover, permitting the spring to rebound and rotate the cover from the second rotational position toward the first rotational position, thereby automatically adjusting the blade clamp from the unlocked configuration to the locked configuration.

The present invention provides, in another aspect, a method of operating a blade clamp of a reciprocating power tool. The method includes biasing, with a first spring, a cover of the blade clamp into a first rotational position relative to a spindle to which the blade clamp is coupled. The first rotational position coincides with a locked configuration of the blade clamp. The method further includes biasing an ejector pin positioned within the spindle toward the cover with a second spring. The method further includes maintaining the blade clamp in an unlocked configuration against the bias of the first spring with engagement between the ejector pin and the cover, thereby maintaining the cover in a second rotational position. The method further includes inserting the blade into the spindle, and in response to insertion of the blade into the spindle, disengaging the ejector pin from the cover, permitting the first spring to rebound and rotate the cover from the second rotational position toward the first rotational position, thereby automatically adjusting the blade clamp from the unlocked configuration to the locked configuration.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
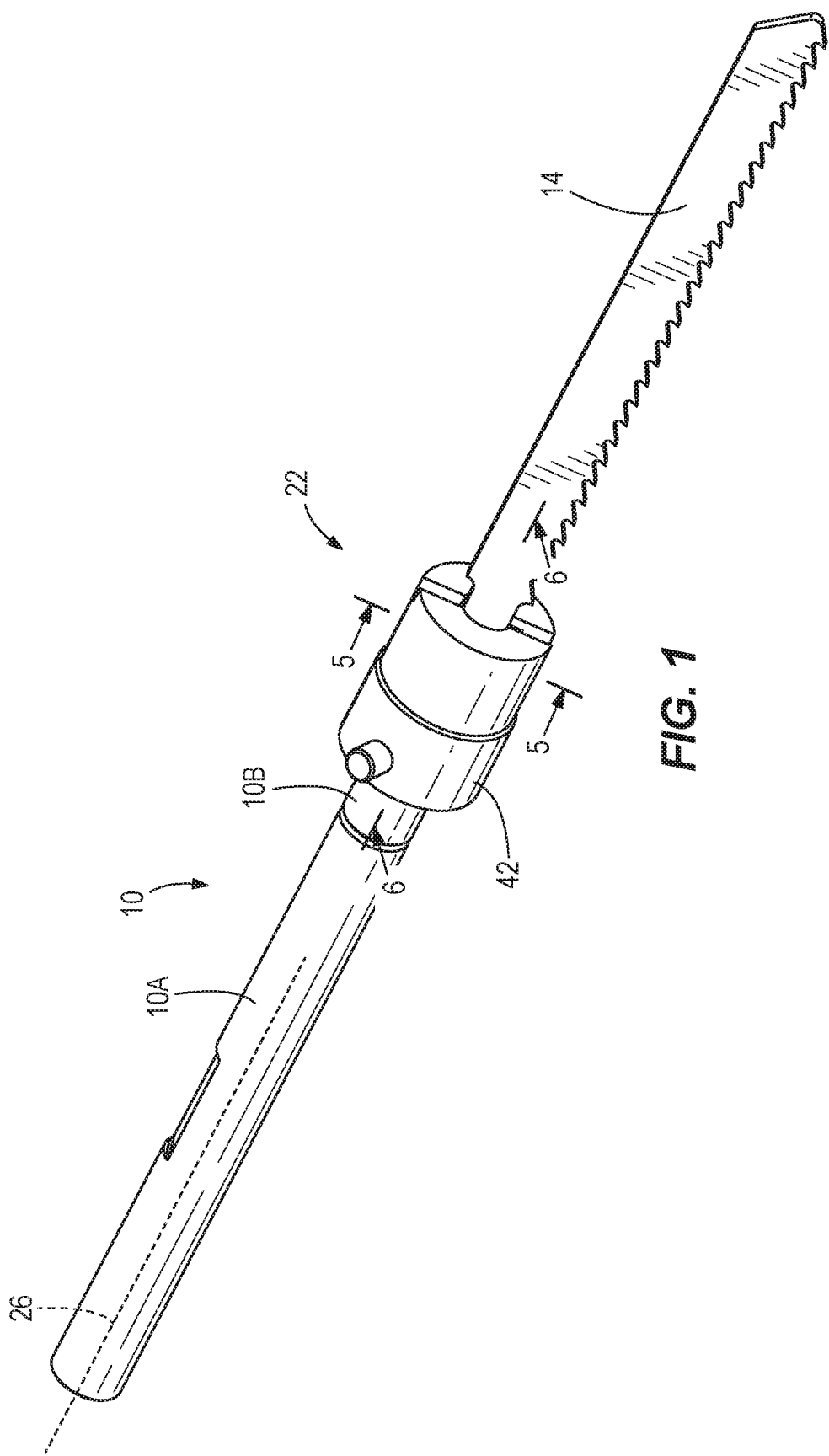
FIG. 1 is perspective view of a blade clamp in accordance with an embodiment of the invention securing a cutting blade to a spindle of a power tool.
Figure 7:
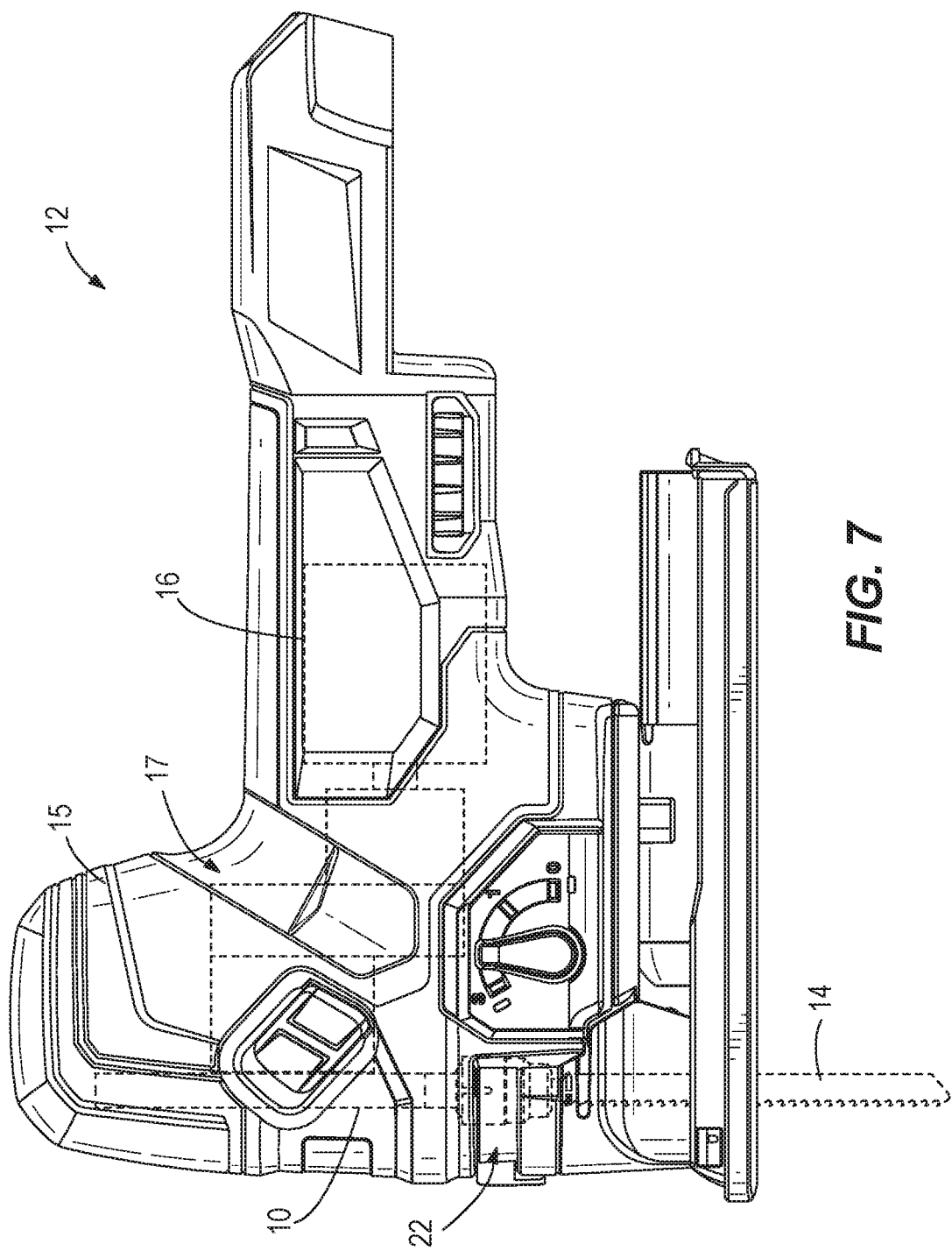
FIG. 7 is a plan view of the power tool in accordance with the embodiment of the invention of FIG. 1.

FIG. 1 illustrates a spindle 10 of a power tool 12 (FIG. 7), a cutting blade 14, and a blade clamp 22 for selectively securing the blade 14 to the spindle 10. In the illustrated embodiment, as shown in FIG. 7, the power tool 12 is a jigsaw and reciprocating motion is imparted to the spindle 10 and the connected blade 14 for cutting a workpiece. The power tool 12 includes a housing 15 for supporting a motor 16 and a gear train 17 (shown schematically). The spindle 10 is connected to an output of the gear train 17 for relative movement therewith.

Figure 2:
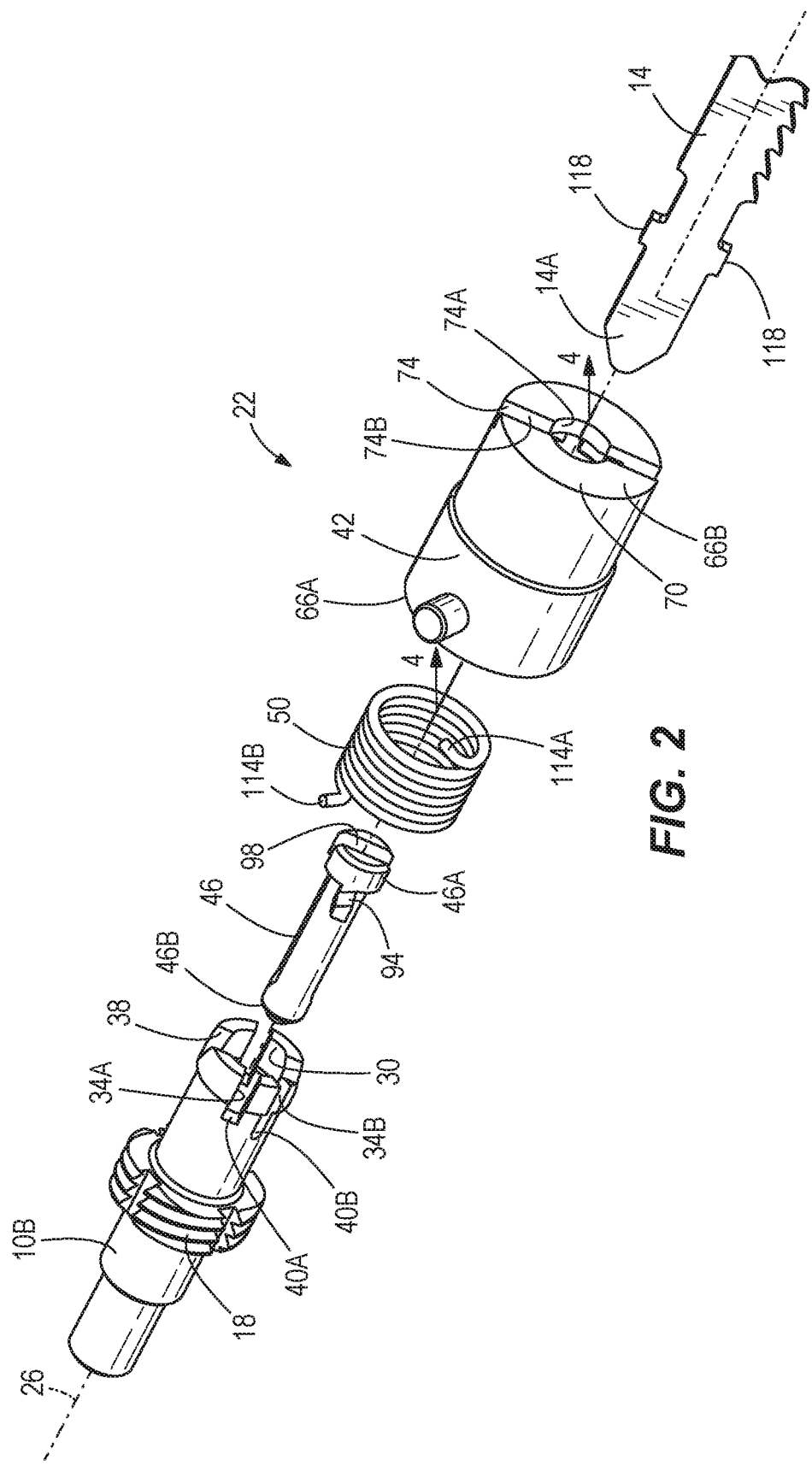
FIG. 2 is an exploded view of the blade clamp of FIG. 1.
Figure 5:
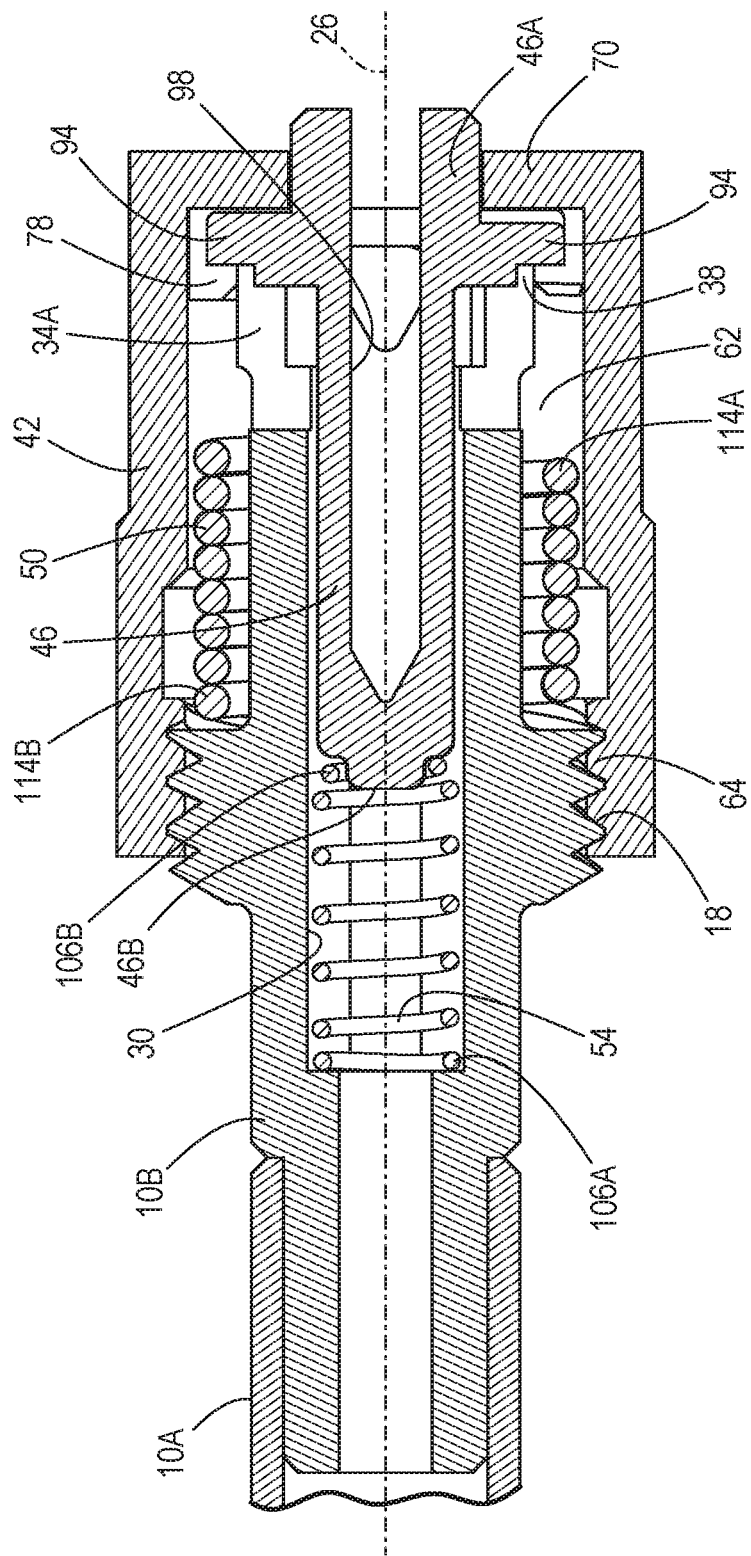
FIG. 5 is a cross-sectional view of the blade clamp of FIG. 1, taken along line 5-5 in FIG. 1, in an unlocked configuration.

With reference to FIGS. 1, 2, and 5, the spindle 10 defines a longitudinal axis 26 extending through the blade clamp 22 and the blade 14. In the illustrated embodiment, the spindle 10 includes a first portion 10A and a separate, second portion 10B partially received within and coupled for co-rotation with the first portion 10A (FIG. 5). The first portion 10A is connectable to a reciprocating mechanism in the jigsaw 12 (e.g., a scotch yoke mechanism). The second portion 10B of the spindle 10 is a body 10B, which is a component of the blade clamp 22, having a plurality of thread segments 18 (FIG. 2) on the outer periphery thereof. The body 10B includes a bore 30 coaxial with the longitudinal axis 26 and two pairs of aligned, laterally spaced notches 34A, 34B that extend radially inward from the outer periphery of the body 10B and communicate with the bore 30 (FIG. 2). The bore 30 and the notches 34A, 34B extend from an end 38 of the body 10B opposite the first portion 10A of the spindle 10 to respective bottom ends 40A, 40B of the notches 34A, 34B. Although the body 10B is a separate portion of the spindle 10 in the illustrated embodiment, the body 10B may alternatively be integrally formed with the spindle 10 as a single piece.

With reference to FIGS. 2-6, the blade clamp 22 also includes a cover 42, an ejection pin 46 positioned within the bore 30, and a torsion spring 50 coupling the body 10B and the cover 42 (FIG. 5). The blade clamp 22 further includes a compression spring 54 positioned within the bore 30 for biasing the ejection pin 46 toward the end 38 of the body 10B.

Figure 3:
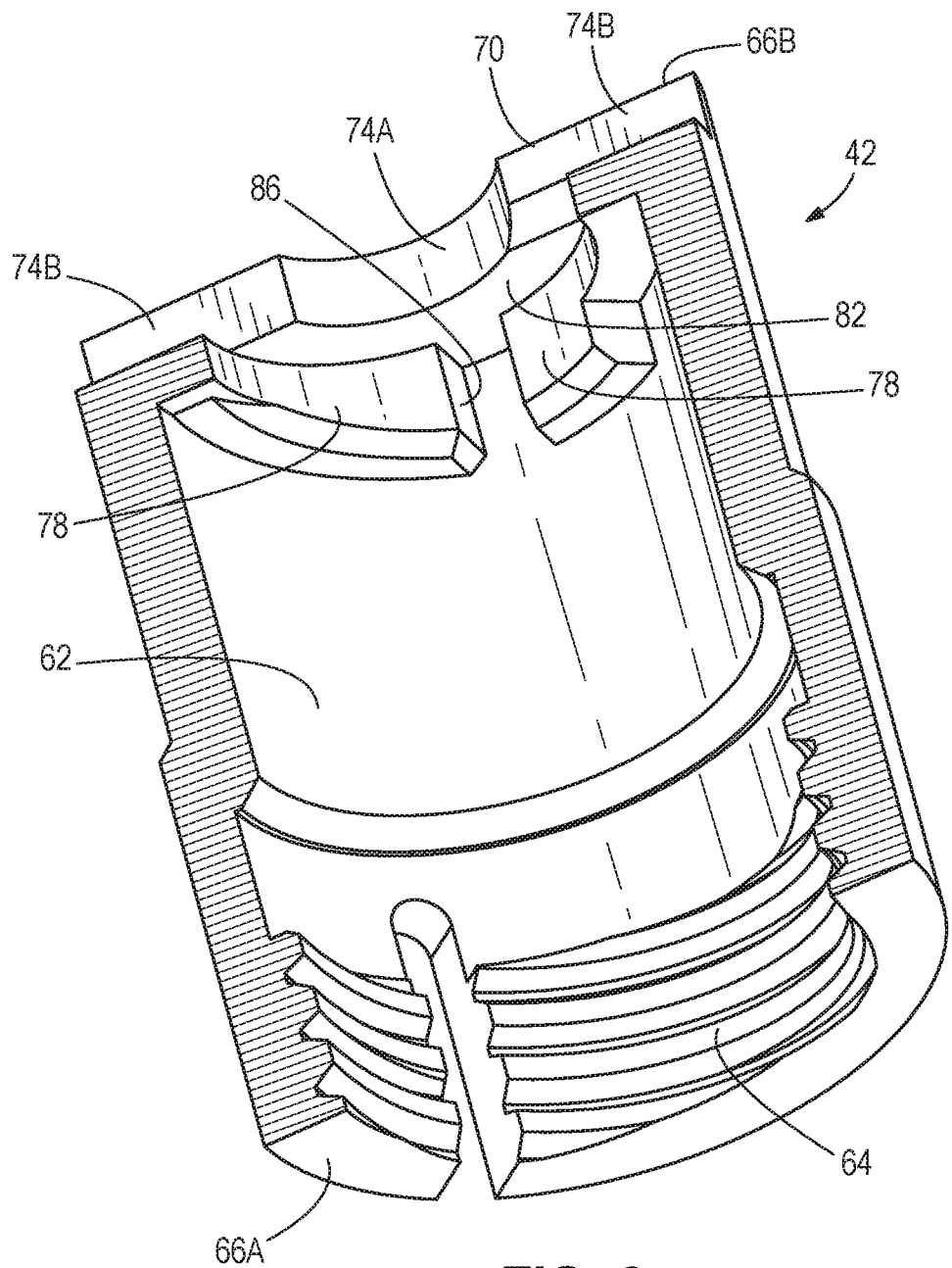
FIG. 3 is a cross-sectional view of a cover of the blade clamp of FIG. 1 taken along line 3-3 shown in FIG. 2.

With continued reference to FIGS. 2-6, the cover 42 has a generally cylindrical shape and includes an inner surface 62 (FIG. 3), a first end 66A, and an opposite second end 66B. The cover 42 includes threads 64 on the inner surface 62 proximate the first end 66A engaged with the thread segments 18 on the body 10B (FIG. 5). The cover 42 includes a face 70 at the second end 66B (FIG. 3). The face 70 includes a slot 74 (FIG. 2) having a first, circular portion 74A, and second, lateral portions 74B extending from opposite sides of the circular portion 74A perpendicular to the longitudinal axis 26. The blade 14 is receivable through the slot 74.

With reference to FIG. 3, the cover 42 further includes multiple internal shoulders 78 proximate the second end 66B and adjacent the face 70. The shoulders 78 extend radially inward from the inner surface 62 and define slots 86 (only one of which is shown in FIG. 3) therebetween. In the illustrated embodiment of the blade clamp 22, the cover 42 includes two slots 86, spaced laterally on opposite sides of the longitudinal axis 26, positioned at an angle of about ninety degrees relative to the slot 74.

Figure 6:
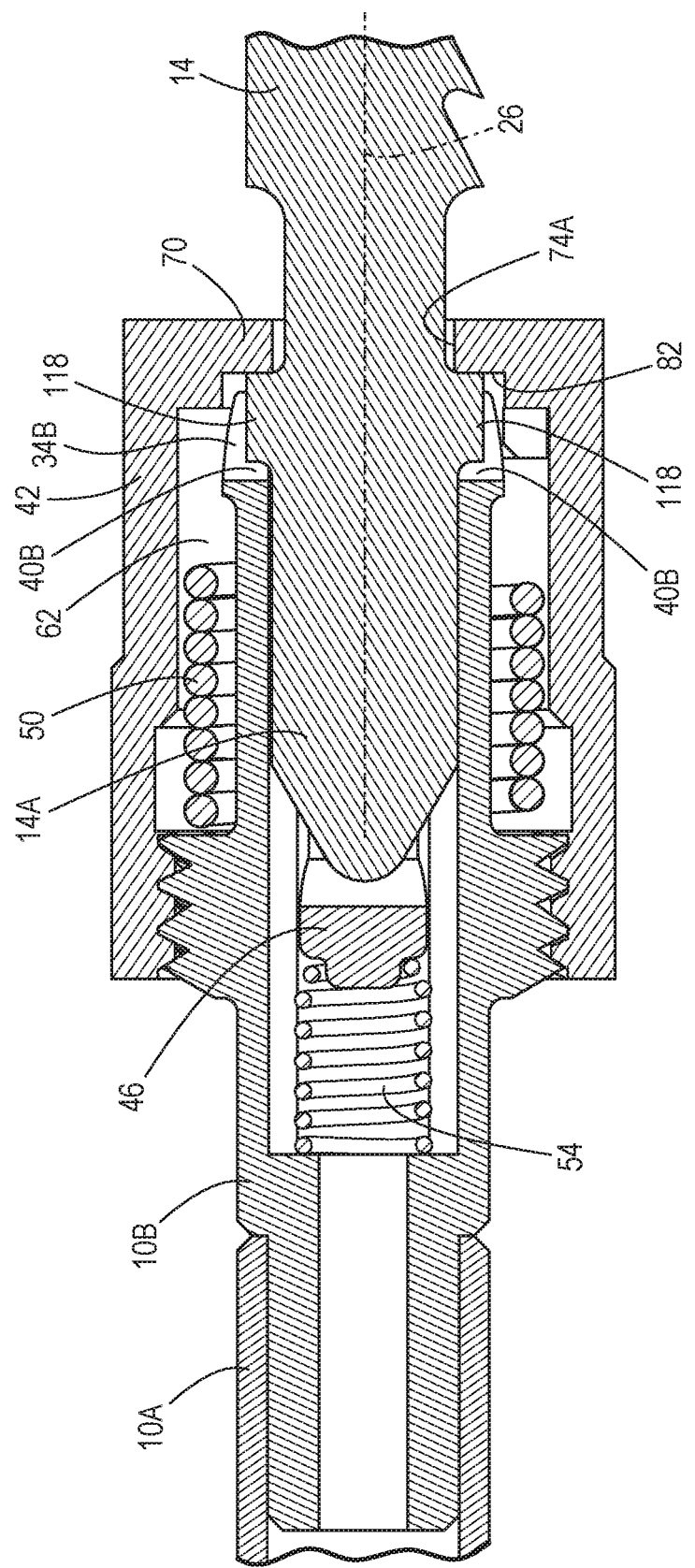
FIG. 6 is another cross-sectional view of the blade clamp of FIG. 5 in a locked configuration.

With reference to FIGS. 2, 5, and 6, the ejection pin 46 includes two projections 94, spaced laterally on opposite sides of the longitudinal axis 26, extending radially outward. The pin 46 has a generally cylindrical shape and includes a slot 98 (FIGS. 2 and 5) at one end 46A extending along the length of the pin 46. As described in more detail below, the slot 98 is aligned with the slot 74 in the cover 42 when the blade 14 is inserted into the blade clamp 22. With reference to FIG. 5, the cylindrical end 46A of the pin 46 may extend through (i.e., telescope from) the circular portion 74A of the slot 74 beyond the face 70 of the cover 42.

Figure 4:
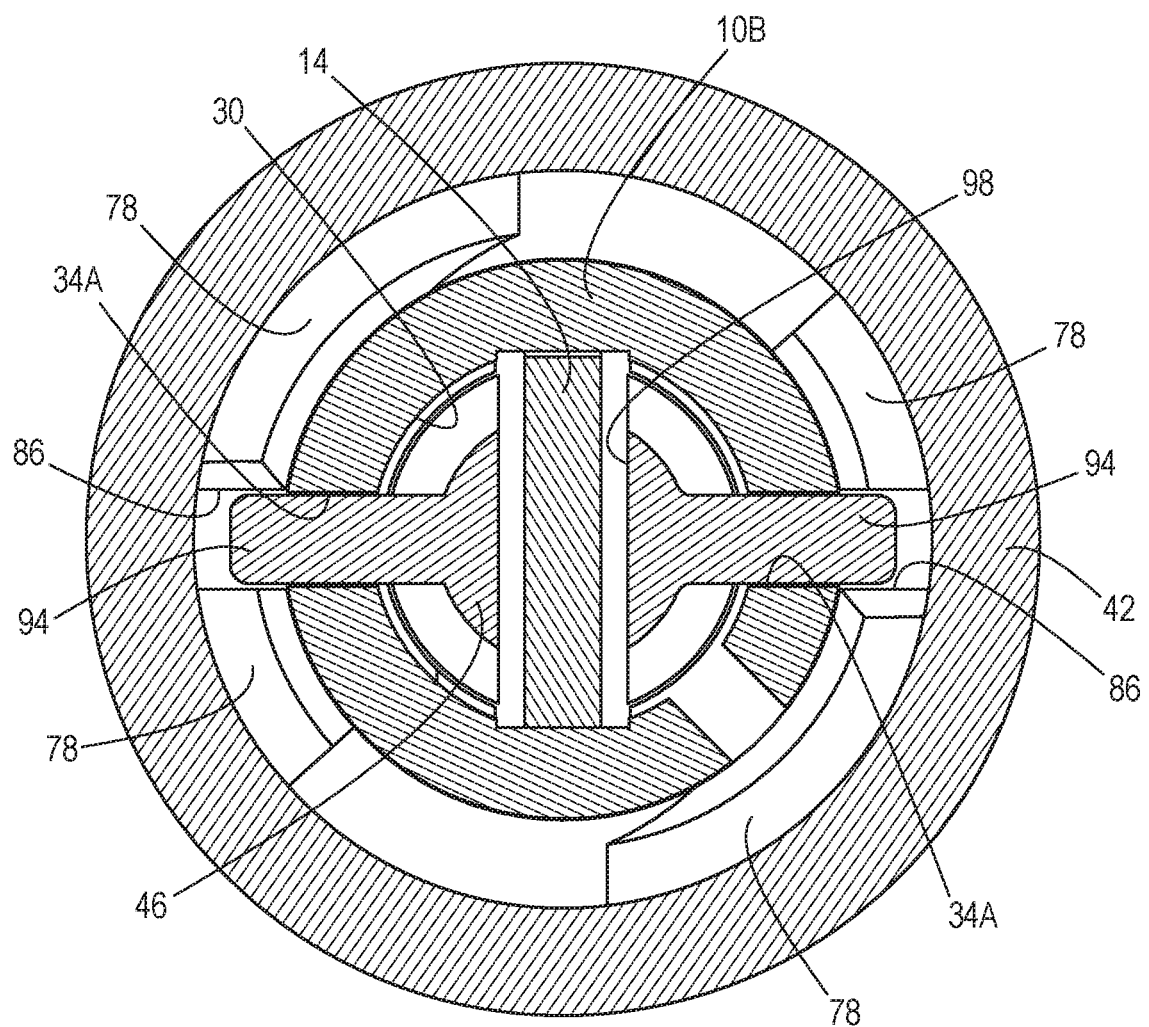
FIG. 4 is a cross-sectional view of the blade clamp of FIG. 1 taken along line 4-4 shown in FIG. 1.

With reference to FIGS. 2 and 4, the projections 94 on the ejection pin 46 are slidably receivable within the respective slots 86 in the interior of the cover 42. Furthermore, the projections 94 are also slidably received in the respective notches 34A in the body 10B, thereby rotationally constraining the pin 46 relative to the body 10B.

With reference to FIG. 5, the compression spring 54 includes opposite ends 106A, 106B. The first end 106A is seated against an internal shoulder that at least partially defines the bore 30, and the second end 106B is seated against an end 46B of the pin 46 opposite the cylindrical end 46A. Therefore, the compression spring 54 biases the pin 46 along the longitudinal axis 26 toward the end 38 of the body 10B. As such, the pin 46 is displaceable within the body 10B in opposite directions along the longitudinal axis 26.

With reference to FIG. 2, the torsion spring 50 includes ends 114A, 114B coupled, respectively, to the body 10B and the cover 42. The torsion spring 50 biases the cover 42 toward a first rotational position relative to the body 10B coinciding with a locked configuration of the blade clamp 22. The cover 42 is rotatable against the bias of the torsion spring 50 toward a second rotational position relative to the body 10B coinciding with an unlocked configuration of the blade clamp 22. Specifically, the torsion spring 50 is configured to rotate the cover 42 about the thread segments 18 such that the cover 42 is also axially displaceable along the body 10B relative to the longitudinal axis 26 when the blade clamp 22 is adjusted between the first and second rotational positions.

With reference to FIG. 2, the blade 14 includes a stem portion 14A and two shoulder portions 118 extending laterally from the stem portion 14A. The stem portion 14A is receivable within the blade clamp 22, specifically through the aligned slots 74, 98 in the cover 42 and the pin 46, respectively. The slot 74 is sufficiently wide (i.e., in a radial direction) for the shoulder portions 118 of the blade 14 to pass completely through the slot 74 for positioning on the interior side of the face 70 (as shown in FIG. 6). The shoulder portions 118 are further receivable in the respective notches 34B (FIG. 2) of the body 10B.

With reference to FIG. 6, in the locked configuration of the blade clamp 22, the slot 74 is rotationally misaligned with the slot 98 in the ejection pin 46 (and the notches 34B in the body 10B), such that the shoulder portions 118 of the blade 14 are positioned adjacent and in contact with an interior surface 82 of the face 70. The blade 14 extends through the circular portion 74A of the slot 74, while the shoulder portions 118 engage the interior surface 82 of the face 70. Furthermore, the axial displacement of the cover 42, as it is moved from the second rotational position to the first rotational position, clamps the shoulder portions 118 between the interior surface 82 and the respective bottom ends 40B of the notches 34B. The compression spring 54 may further bias the shoulder portions 118 against the interior surface 82.

In operation, with reference to FIGS. 5 and 6, the blade clamp 22 is adjustable between an open, unlocked configuration (FIG. 5) and a closed, locked configuration (FIG. 6). When the blade clamp 22 is in the unlocked configuration, the projections 94 on the pin 46 are positioned within the respective slots 86 in the cover 42. Because the pin 46 is rotationally constrained to the body 10B as described above, the projections 94 inhibit rotational movement of the cover 42 when positioned in the slots 86. The compression spring 54 maintains the projections 94 against the interior surface 82 (FIG. 3) of the face 70 for maintaining the blade clamp 22 in the unlocked configuration, in which the slots 74, 98 are rotationally aligned about the longitudinal axis 26 for receiving the stem portion 14A of the blade 14.

During insertion of the stem portion 14A of the blade 14 through the aligned slots 74, 98, continued displacement of the blade 14 in the insertion direction also displaces the ejection pin 46 rearward (i.e., to the left from the frame of reference of FIGS. 5 and 6) along the longitudinal axis 26 against the bias of the spring 54. Subsequently, the projections 94 are removed from the slots 86 in the cover 42, permitting the torsion spring 50 to rebound and rotate the cover 42 from the second rotational position (where the slots 74, 98 are rotationally aligned) toward the first rotational position (where the slots 74, 98 are rotationally misaligned). The slots 34A in the body 10B are longer than the slots 86 in the cover 42, allowing the shoulder portions 118 of the blade 14 to be positioned rearward of the interior surface 82 of the face 70 (FIG. 6). The cover 42 moves axially rearward (i.e., to the left from the frame of reference of FIG. 6) along the body 10B when adjusting to the first rotational position such that the interior surface 82 moves toward the shoulder portions 118. Once the cover 42 has reached its first rotational position and the blade 14 has been released by the user, the shoulder portions 118 are clamped between the interior surface 82 of the face 70 and the bottom ends 40B of the notches 34B for locking the blade clamp 22 in the locked configuration. As such, insertion of the blade 14 by a user automatically adjusts the blade clamp 22 from the unlocked configuration to the locked configuration. Because the blade clamp 22 is normally maintained in the unlocked configuration when a blade 14 is not attached, the blade clamp 22 may allow insertion of the blade 14 by the user only using one hand.

To adjust the blade clamp 22 from the locked configuration to the unlocked configuration, the user rotates the cover 42 from the first rotational position against the bias of the torsional spring 50 toward the second rotational position, axially displacing the interior surface 82 of the face 70 away from the shoulder portions 118, thereby releasing the clamping force on the blade 14. Subsequently, the slots 74, 98 are re-aligned such that the shoulder portions 118 of the shank 14A no longer engage the interior surface 82. The compression spring 54 rebounds to displace the pin 46 forward along the longitudinal axis 26, ejecting the blade 14 from the blade clamp 22 through the slot 74. The projections 94 are again received within the slots 86 in the cover 42 upon the pin 46 reaching its forward-most position within the bore 30, again maintaining the blade clamp 22 in the unlocked configuration.

Various features of the invention are set forth in the following claims.

What is claimed is:

1. A blade clamp for use with a power tool having a reciprocating spindle, the blade clamp comprising:
    a cover threaded to the spindle for relative axial movement thereto in response to rotation of the cover relative to the spindle, the cover including a front face at one end thereof and a first slot defined in the front face through which a blade is receivable;
    an ejector pin positioned within the spindle; and
    a spring coupling the cover and the spindle;
    wherein the spring biases the cover toward a first rotational position relative to the spindle coinciding with a locked configuration of the blade clamp,
    wherein the cover is rotatable against the bias of the spring toward a second rotational position relative to the spindle coinciding with an unlocked configuration of the blade clamp,
    wherein in the unlocked configuration, the ejector pin maintains the cover in the second rotational position and at least partially protrudes beyond the front face of the cover, and
    wherein, in response to insertion of the blade into the spindle, the ejector pin disengages the cover, permitting the spring to rebound and rotate the cover from the second rotational position toward the first rotational position, thereby automatically adjusting the blade clamp from the unlocked configuration to the locked configuration.

2. The blade clamp of claim 1, wherein the ejector pin includes a second slot at an end thereof protruding beyond the front face of the cover, and wherein the blade is receivable within the second slot.

3. The blade clamp of claim 2, wherein in the unlocked configuration, the first slot and the second slot are rotationally aligned, and in the locked configuration, the first slot and the second slot are rotationally misaligned.

4. The blade clamp of claim 1, wherein the cover includes an inner surface in facing relationship with the spindle and a first attachment element defined at least partially by the inner surface, the first attachment element configured to cooperate with a second attachment element of the ejector pin to maintain the cover in the second rotational position, and wherein insertion of the blade into the spindle displaces the ejection pin, thereby disengaging the first attachment element from the second attachment element.

5. The blade clamp of claim 4, further comprising a second spring for biasing the second attachment element toward the first attachment element.

6. The blade clamp of claim 4, wherein the inner surface extends axially relative to a longitudinal axis of the spindle from the front face to a second end of the cover opposite the one end, wherein the first attachment element is positioned axially inward of the front face at the one end and radially inward of the inner surface relative to the longitudinal axis.

7. The blade clamp of claim 1, further comprising a second spring coupling the spindle and the ejector pin, wherein the second spring biases the ejector pin toward the cover in the unlocked configuration and the locked configuration, and wherein the ejector pin is displaceable by the blade against the bias of the second spring.

8. The blade clamp of claim 7, wherein the ejector pin includes a second slot configured to receive the blade, wherein the front face has an interior surface in facing relationship with the second slot, and wherein the second spring biases the ejector pin toward the interior surface.

9. The blade clamp of claim 1, wherein the spindle includes a notch, wherein the blade is receivable through the first slot into the notch, and wherein a portion of the blade is configured to be clamped between a bottom end of the notch and an interior surface of the front face when the blade clamp is in the locked configuration.

10. The blade clamp of claim 1, further comprising a first attachment element positioned adjacent the front face of the cover, the first attachment element configured to cooperate with a second attachment element of the ejector pin to maintain the cover in the second rotational position, wherein the spindle defines a longitudinal axis extending therethrough, and wherein the first attachment element is positioned radially outward of the first slot relative to the longitudinal axis.

11. A reciprocating power tool comprising:
    a housing;
    a spindle supported by the housing for relative movement therewith; and
    a blade clamp for securing a blade to the spindle, the blade clamp including
        a cover threaded to the spindle for relative axial movement thereto in response to rotation of the cover relative to the spindle, the cover including a front face at one end thereof and a first slot defined in the front face through which a blade is receivable;
        an ejector pin positioned within the spindle; and a spring coupling the cover and the spindle,
wherein the spring biases the cover toward a first rotational position relative to the spindle coinciding with a locked configuration of the blade clamp,
wherein the cover is rotatable against the bias of the spring toward a second rotational position relative to the spindle coinciding with an unlocked configuration of the blade clamp,
wherein in the unlocked configuration, the ejector pin maintains the cover in the second rotational position and at least partially protrudes beyond the front face of the cover, and
wherein in response to insertion of the blade into the spindle, the ejector pin disengages the cover, permitting the spring to rebound and rotate the cover from the second rotational position toward the first rotational position, thereby automatically adjusting the blade clamp from the unlocked configuration to the locked configuration.

12. The reciprocating power tool of claim 11, wherein the ejector pin includes a second slot at an end thereof protruding beyond the front face of the cover, and wherein the blade is received within the second slot.

13. The reciprocating power tool of claim 12, wherein in the unlocked configuration, the first slot and the second slot are rotationally aligned, and in the locked configuration, the first slot and the second slot are rotationally misaligned.

14. The reciprocating power tool of claim 11, further comprising a second spring coupling the spindle and the ejector pin, wherein the second spring biases the ejector pin toward the cover in the unlocked configuration and the locked configuration, and wherein the ejector pin is displaceable by the blade against the bias of the second spring.

15. The reciprocating power tool of claim 11, wherein the cover includes an inner surface in facing relationship with the spindle and a first attachment element defined at least partially by the inner surface, the first attachment element configured to cooperate with a second attachment element of the ejector pin to maintain the cover in the second rotational position, and wherein insertion of the blade into the spindle displaces the ejection pin thereby disengaging the first attachment element from the second attachment element.

16. The reciprocating power tool of claim 15, further comprising a second spring for biasing the second attachment element toward the first attachment element.

17. The reciprocating power tool of claim 11, wherein the spindle includes a notch, wherein the blade is received through the first slot into the notch, and wherein a portion of the blade is clamped between a bottom end of the notch and an interior surface of the front face when the blade clamp is in the locked configuration.

18. A method of operating a blade clamp of a reciprocating power tool, the method comprising:
biasing, with a first spring, a cover of the blade clamp into a first rotational position relative to a spindle to which the blade clamp is coupled, the first rotational position coinciding with a locked configuration of the blade clamp, the cover threaded to the spindle for relative axial movement thereto in response to rotation of the cover relative to the spindle, the cover including a front face at one end thereof and a first slot defined in the front face through which a blade is receivable;
biasing an ejector pin positioned within the spindle toward the cover with a second spring;
maintaining the blade clamp in an unlocked configuration against the bias of the first spring with engagement between the ejector pin and the cover, thereby maintaining the cover in a second rotational position;
protruding, when the blade clamp is in the unlocked configuration, the ejector pin at least partially beyond the front face of the cover;
inserting the blade through the first slot of the cover and into the spindle; and
in response to insertion of the blade into the spindle, disengaging the ejector pin from the cover, permitting the first spring to rebound and rotate the cover from the second rotational position toward the first rotational position, thereby axially moving the cover relative to the spindle and automatically adjusting the blade clamp from the unlocked configuration to the locked configuration.

19. The method of claim 18, wherein inserting the blade through the first slot of the cover and into the spindle includes inserting the blade through a second slot in the ejector pin at an end thereof protruding beyond the front face of the cover, wherein maintaining the blade clamp in the unlocked configuration further comprises rotationally aligning the first slot and the second slot, and wherein in the locked configuration, the first slot and the second slot are rotationally misaligned.

20. The method of claim 18, wherein maintaining the blade clamp in the unlocked configuration further comprises limiting rotational movement of the cover by engagement between a first attachment element of the cover and a second attachment element of the ejector pin, and wherein insertion of the blade into the spindle displaces the ejection pin against the bias of the second spring, thereby disengaging the first attachment element from the second attachment element, and permitting the rotational movement of the cover from the second rotational position to the first rotational position.

21. The method of claim 18, wherein the spindle includes a notch, wherein inserting the blade through the first slot of the cover and into the spindle further comprises inserting the blade through the first slot and into the notch, and wherein, in response to disengaging the ejector pin from the cover, clamping a portion of the blade between a bottom end of the notch and an interior surface of the front face with the bias of the second spring when the blade clamp is in the locked configuration.

* * * * *